(12) United States Patent
Kim

(10) Patent No.: US 12,528,471 B2
(45) Date of Patent: Jan. 20, 2026

(54) METHOD FOR CONTROLLING CENTER FOLLOWING OF TRAVELING VEHICLE BY APPLYING LANE WEIGHT, AND APPARATUS THEREOF

(71) Applicant: HL Klemove Corp., Incheon (KR)

(72) Inventor: Hyeongtae Kim, Gwangmyeong-si (KR)

(73) Assignee: HL Klemove Corp., Incheon (KR)

( * ) Notice: Subject to any disclaimer, the term of this patent is extended or adjusted under 35 U.S.C. 154(b) by 181 days.

(21) Appl. No.: 18/380,008

(22) Filed: Oct. 13, 2023

(65) Prior Publication Data

US 2024/0391469 A1 Nov. 28, 2024

(30) Foreign Application Priority Data

May 22, 2023 (KR) ........................ 10-2023-0065591

(51) Int. Cl.
*B60W 40/072* (2012.01)
*B60W 30/12* (2020.01)
*G06V 20/56* (2022.01)
*G08G 1/16* (2006.01)

(52) U.S. Cl.
CPC .......... *B60W 40/072* (2013.01); *B60W 30/12* (2013.01); *G06V 20/588* (2022.01); *G08G 1/167* (2013.01); *B60W 2420/403* (2013.01); *B60W 2552/10* (2020.02); *B60W 2552/30* (2020.02)

(58) Field of Classification Search
CPC ........... B60W 30/12; B60W 30/18145; B60W 40/06; B60W 40/072; B60W 2050/0002; B60W 2050/0022; B60W 2420/403; B60W 2420/408; B60W 2552/10; B60W 2552/30; B60W 2552/53; B60W 2554/801; B60W 2710/20; G06V 20/588; G06V 20/56; G08G 1/167; G05D 2107/13; B60Y 2300/12; B60Y 2300/24; B60Y 2400/301; B60Y 2400/3017; B60Y 2400/3015

See application file for complete search history.

(56) References Cited

U.S. PATENT DOCUMENTS

| | | | |
|---|---|---|---|
| 2011/0015850 A1* | 1/2011 | Tange | B60W 30/12 |
| | | | 701/116 |
| 2016/0314360 A1* | 10/2016 | Kizumi | G06V 20/588 |
| 2019/0193785 A1* | 6/2019 | Ku | B60W 30/12 |
| 2020/0234063 A1* | 7/2020 | Min | G06T 7/70 |
| 2022/0266874 A1* | 8/2022 | Blandizzi | B60W 60/00274 |
| 2024/0343249 A1* | 10/2024 | Wang | B60W 30/14 |
| 2025/0146833 A1* | 5/2025 | Han | B60W 40/04 |

* cited by examiner

*Primary Examiner* — Brandon Z Willis
(74) *Attorney, Agent, or Firm* — Harvest IP Law, LLP

(57) ABSTRACT

The present disclosure provides a method for controlling center following of a traveling vehicle by applying a lane weight, and apparatus thereof. The method, which is performed by a lane recognition apparatus to control center following of a traveling vehicle by applying a lane weight, includes receiving image data including a lane during traveling of the traveling vehicle, recognizing left and right lanes in the image data, setting recognition weights for the left and right lanes based on a difference between left and right lane recognition values, calculating a central curvature and a central curvature change rate for center following of a traveling vehicle based on the left and right lane recognition weights, and transmitting a center following signal of a traveling vehicle based on the central curvature and the central curvature change rate.

18 Claims, 4 Drawing Sheets

METHOD FOR CONTROLLING CENTER FOLLOWING OF TRAVELING VEHICLE BY APPLYING LANE WEIGHT, AND APPARATUS THEREOF

TECHNICAL FIELD

The present disclosure relates to a method and apparatus for controlling center following of a traveling vehicle by applying a lane weight, and more specifically, a method and an apparatus for controlling center following of a traveling vehicle by setting a recognition weight based on a difference between left and right lane recognition values.

BACKGROUND

Among the advanced driver assistance systems (ADAS) of recently released vehicles, there is an auxiliary function that keeps a lane in a center as a key specification. It corresponds to a function that is one level higher than the auxiliary function that simply prevents a vehicle from leaving the lane, and is related to the function that keeps the lane in the center. Most of the companies that produce and provide vehicles equipped with autonomous traveling technology to prepare for the future era of autonomous traveling are developing various functions for maintaining lane center following.

However, since the function is at the level of driver assistance rather than autonomous traveling, it is necessary for the driver to keep an eye on the front and prepare for unexpected situations such as disabling the system.

In addition, for center following of the traveling vehicle, center following is performed based on the recognition of the left and right lanes, and there is a need to develop a technology that can flexibly respond to a case where a recognition state of the left and right lanes is not good or when at least one of the left and right lanes changes.

Therefore, it is necessary to discuss how to process the recognition of the left and right lanes of the traveling vehicle in a certain way in order to control the center following of the traveling vehicle.

The above-mentioned background art is technical information that the inventor possessed for derivation of the present disclosure or obtained in the course of derivation of the present disclosure, and cannot necessarily be said to be a technology known to the general public prior to filing the present disclosure.

SUMMARY

An object of the present disclosure is to control center following of a traveling vehicle and provide safe traveling through a method for controlling center following during traveling of the traveling vehicle.

In addition, another object of the present disclosure is to provide a method and apparatus capable of performing control when a recognition state of left and right lanes of a road is not good or curvatures of the left and right lanes are changed during traveling.

In addition, still another object of the present disclosure is to provide a method and apparatus capable of controlling center following in real time by dynamically applying recognition weights of left and right lanes.

According to an aspect of the present disclosure, there is provided a method which is performed by a lane recognition apparatus to control center following of a traveling vehicle by applying a lane weight, the method including: receiving image data including a lane during traveling of the traveling vehicle; recognizing left and right lanes in the image data; setting recognition weights for the left and right lanes based on a difference between left and right lane recognition values; calculating a central curvature and a central curvature change rate for center following of a traveling vehicle based on the left and right lane recognition weights; and transmitting a center following signal of a traveling vehicle based on the central curvature and the central curvature change rate.

In the aspect, the setting of the recognition weights for the left and right lanes based on the difference between the left and right lane recognition values may further include calculating a recognition distance of the left and right lanes.

In the aspect, the setting of the recognition weights for the left and right lanes based on the difference between the left and right lane recognition values may further include calculating the weights for the left and right lanes through a recognition distance ratio equation of the left and right lanes.

In the aspect, the recognition distance ratio equation may be an equation calculated as the ratio of the left and right lane recognition distances from the sum of the left lane recognition distance and the right lane recognition distance.

In the aspect, the center curvature for center following may be calculated as the sum of a product of a left lane curvature and a left lane recognition weight and a product of a right lane curvature and a right lane recognition weight.

In the aspect, the center curvature change rate for center following may be calculated as the sum of a product of a left lane curvature change rate and the left lane recognition weight, and a product of a right lane curvature change rate and the right lane recognition weight product.

In the aspect, in the calculating of the recognition distance of the left and right lanes, when the difference between the recognition distances of the left and right lanes is equal to or less than a threshold value, each of the recognition weights of the left and right lanes may be set to 1.

In the aspect, in the calculating of the recognition distance of the left and right lanes, when the difference between the recognition distances of the left and right lanes is equal to or less than a threshold value, the weight may be set to 1 for any one of the recognition weights of the left and right lanes.

According to the aspects of the present disclosure, it is possible to control the center following of the traveling vehicle and provide safe traveling through the method for controlling the center following during the traveling of the traveling vehicle.

In addition, according to the aspects of the present disclosure, it is possible to provide a method and apparatus capable of performing control when a recognition state of left and right lanes of a road is not good or curvatures of the left and right lanes are changed during traveling.

In addition, according to the aspects of the present disclosure, it is possible to provide a method and apparatus capable of controlling center following in real time by dynamically applying recognition weights of left and right lanes.

DETAILED DESCRIPTION

Figure 1:
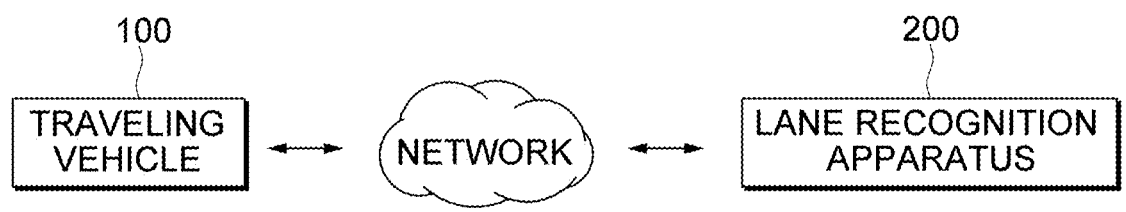
FIG. 1 illustrates an exemplary environment to which a lane recognition apparatus according to some embodiments of the present disclosure may be applied.

Hereinafter, preferred embodiments of the present disclosure will be described in detail with reference to the accompanying drawings. Advantages and features of the present disclosure, and methods of achieving them, will become clear with reference to the embodiments described below in detail in conjunction with the accompanying drawings. However, the technical spirit of the present disclosure is not limited to the following embodiments and can be implemented in various different forms, the following embodiments are merely provided to complete the technical spirit of the present disclosure and to fully inform those skilled in the art of the scope of the present disclosure, and the technical spirit of the present disclosure is only defined by the scope of the claims.

In adding reference numerals to components of each drawing, it should be noted that the same components have the same numerals as much as possible even when they are displayed on different drawings. In addition, in describing the present disclosure, when it is determined that a detailed description of a related known configuration or function may obscure the gist of the present disclosure, the detailed description will be omitted.

Unless otherwise defined, all terms (including technical and scientific terms) used in the present specification may be used with meanings commonly understood by those of ordinary skill in the art to which this disclosure belongs. In addition, terms defined in commonly used dictionaries are not interpreted ideally or excessively unless explicitly specifically defined. Terminology used herein is for describing the embodiments and is not intended to limit the present disclosure. In the present specification, the singular also includes the plural unless specifically stated otherwise.

Moreover, terms such as first, second, A, B, (a), and (b) may be used in describing the components of the present disclosure. These terms are only used to distinguish the component from other components, and the nature, sequence, or order of the corresponding component is not limited by the term. When an element is described as being "connected," "coupled," or "joined" to another element, it will be understood that the components may be directly connected or joined to the other components, but that another component may be "connected", "coupled" or "joined" between the components.

As used herein, "comprises" and/or "comprising" means that a stated component, step, operation, and/or element do not exclude the presence or addition of one or more other components, steps, operations, and/or elements.

Hereinafter, various embodiments of the present disclosure will be described in detail with reference to the accompanying drawings.

In addition, in describing the components of the present disclosure, terms such as first, second, A, B, (a), and (b) may be used. These terms are only used to distinguish the component from other components, and the nature, sequence, or order of the corresponding component is not limited by the term. Throughout the specification, when a part "includes" or "has" a certain component, this means that other components may be further included without excluding other components unless otherwise stated. Also, terms such as "unit" and "module" described in the specification refer to a unit that processes at least one function or operation, and may be implemented by hardware, software, or a combination of hardware and software.

FIG. 1 illustrates an exemplary environment to which a lane recognition apparatus according to some embodiments of the present disclosure may be applied. Through a system including a traveling vehicle 100 and a lane recognition apparatus 200 illustrated in FIG. 1, the traveling vehicle 100 can follow the center of a lane while traveling.

Hereinafter, operations of components illustrated in FIG. 1 related to center following of the lane of the traveling vehicle 100 through the above-described system will be described in more detail.

FIG. 1 illustrates an example in which the traveling vehicle 100 and the lane recognition apparatus 200 are connected through a network, but this is only for convenience of understanding, and the number of devices that can be connected to the network may vary.

Meanwhile, FIG. 1 only illustrates a preferred embodiment for achieving the object of the present disclosure, and some components may be added or deleted as necessary. Hereinafter, the components illustrated in FIG. 1 will be described in more detail.

The lane recognition apparatus 200 can detect a traveling direction of the traveling vehicle 100 and follow the center of the vehicle of the traveling vehicle 100 by calling information of the traveling vehicle 100. Here, the lane recognition apparatus 200 may collect and analyze various information generated from the traveling vehicle 100.

Various information may include all data generated by the traveling vehicle 100, and may be, for example, a speed of the traveling vehicle, a wheel angle of a steering device, and specifications of the traveling vehicle itself, and may also be information about the environment in which the vehicle travels. This information may be information collected by utilizing a series of devices in the traveling vehicle 100 while the traveling vehicle 100 is traveling, and it goes without saying that the series of devices may include all electronic devices of the traveling vehicle 100 from the point of view of a person skilled in the art. In addition, this information may include information collected when the vehicle stops rather than traveling.

The traveling vehicle 100 illustrated in FIG. 1 may include vehicles equipped with autonomous traveling technology as well as general vehicles not equipped with the autonomous traveling technology. The traveling vehicle 100 may include both a four-wheeled vehicle and a two-wheeled motorcycle.

In order to exclude redundant descriptions, various operations performed by the lane recognition apparatus 200 will be described in more detail later with reference to the drawings below in FIG. 2.

Meanwhile, the lane recognition apparatus 200 may be implemented with one or more computing devices. For example, all functions of the lane recognition apparatus 200 may be implemented in a single computing device. As another example, the first function of the lane recognition apparatus 200 may be implemented in a first computing device, and the second function may be implemented in a second computing device. Here, the computing device may be a notebook, a desktop, or a laptop, but is not limited thereto and may include any type of device equipped with a computing function. However, it may be preferable that the lane recognition apparatus 200 be implemented as a high-performance server-class computing device. An example of a computing device will be described with reference to FIG. 4.

In addition, functions that can additionally be implemented by the lane recognition apparatus 200 may be implemented using the electronic device mounted on the traveling vehicle 100. Therefore, in FIG. 1, the lane recognition apparatus 200 and the traveling vehicle 100 are illustrated separately, but according to one embodiment, it is natural that the lane recognition apparatus 200 is mounted on the traveling vehicle 100 so that the lane recognition apparatus 200 can implement the first function and the second function within the traveling vehicle 100. Accordingly, it should be noted that the interpretation is not limited to an embodiment in which the traveling vehicle 100 and the lane recognition apparatus 200 are externally separated as illustrated in FIG. 1.

In the present specification, for convenience of description, a situation in which the traveling vehicle 100 and the lane recognition apparatus 200 are separated to implement functions will be described.

In some embodiments, components included in an environment to which the lane recognition apparatus 200 is applied may communicate through a network. The network may be implemented as all types of wired/wireless networks such as a Local Area Network (LAN), a Wide Area Network (WAN), a mobile radio communication network, and Wibro (Wireless Broadband Internet).

Meanwhile, the environment illustrated in FIG. 1 illustrates that the traveling vehicle 100 and the lane recognition apparatus 200 are connected through a network, but the scope of the present disclosure is not limited thereto, and it should be noted that the traveling vehicle 100 may be connected to the lane recognition apparatus 200 through a peer to peer (P2P) network.

So far, with reference to FIG. 1, the exemplary environment to which the lane recognition apparatus 200 according to some embodiments of the present disclosure can be applied has been described. Hereinafter, methods according to various embodiments of the present disclosure will be described in detail with reference to the drawings below in FIG. 2.

Each step of the methods described below may be performed by the computing device. In other words, each step of the methods may be implemented as one or more instructions executed by a processor of a computing device. All of the steps involved in these methods could be executed by a single physical computing device, but first steps of the method are performed by the first computing device and second steps of the method are performed by a second computing device.

Hereinafter, in FIG. 2, description will be continued on the assumption that each step of the methods is performed by the lane recognition apparatus 200 illustrated in FIG. 1. However, for convenience of description, the description of the subject of operation of each step included in the methods may be omitted.

Figure 2:
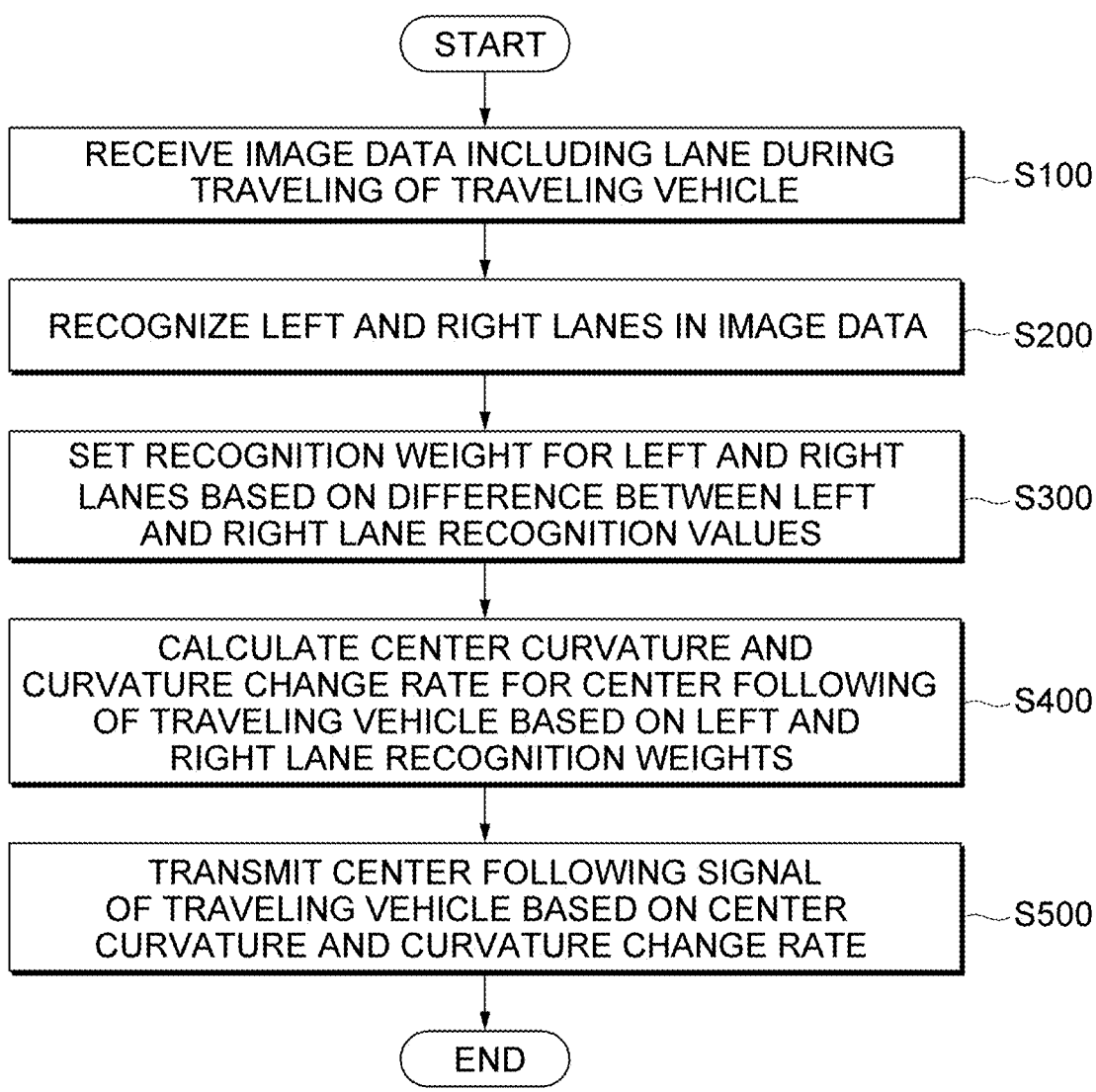
FIG. 2 is a flowchart of a method for controlling center following of a traveling vehicle, which may be performed in a lane recognition apparatus according to some embodiments of the present disclosure.

FIG. 2 is a flowchart of a method for controlling the center following of the traveling vehicle, which may be performed in the lane recognition apparatus according to some embodiments of the present disclosure.

In Step S100, the lane recognition apparatus 200 may receive image data including lanes during the traveling of traveling vehicle 100.

The image data may be a 2D image or a 3D image including objects in the image, and the storage form is not limited to one example. Accordingly, the image data may be image data stored in various types of storage formats such as .jpg, .png, .jpeg, and .mov.

Also, the image data may be image data that includes at least one object in the image data or does not include an object.

Accordingly, it should be noted that the image data in the present disclosure may be image data related to drawings, photographs, or the like that can be obtained by a person skilled in the art, and should not be construed as being limited to a specific image.

In addition, the image data may be an image acquired from the front side of the traveling vehicle 100 through a camera sensor or lidar sensor during the traveling of the traveling vehicle 100. Accordingly, the image data may be data including an image of a forward direction of the traveling vehicle 100 during the traveling of the traveling vehicle 100.

Moreover, the image data may be data including at least one road lane and a road image in relation to the traveling vehicle 100.

In Step S200, the lane recognition apparatus 200 may recognize left and right lanes in the image data.

The lane recognition apparatus 200 can recognize lanes within image data by utilizing a deep learning algorithm, which is an artificial neural network.

Types of artificial neural networks include a convolution neural network (CNN) that extracts features using a filter and a recurrent neural network (RNN) that has a structure in which the output of a node is fed back to an input, and includes various types such as restricted Boltzmann machines (RBMs), deep belief networks (DBNs), generative adversarial networks (GANs), and relational networks (RNs).

Before using an artificial neural network, a learning step is required. Alternatively, it can be learned using an artificial neural network. Hereinafter, the step of learning the artificial neural network will be expressed as a learning step, and the step of using the artificial neutral network as an inference step. There are various methods of learning artificial neural networks, such as supervised learning, unsupervised learning, reinforcement learning, and imitation learning. Here, the reinforcement learning may be expressed as a Markov decision process. Alternatively, the reinforcement learning may refer to how an agent behaves to maximize a reward in an environment.

Image segmentation may mean dividing an area of an image by attributes. Alternatively, the image segmentation may be a process of allocating attribute values for each pixel of the image. For example, the attribute may be a type of object. In this case, the image segmentation may mean segmenting the object included in the image by pixel. Alternatively, the image segmentation may indicate that the specific pixel corresponds to the object.

The image segmentation may be performed using the artificial neural network. One artificial neural network may be used, and each artificial neural network may perform the image segmentation using a plurality of artificial neural networks, and the surrounding environment may be sensed by combining the results. A network structure of the artificial neural network for the image segmentation may be applied with various structures such as an ENet structure.

The artificial neural network that performs the image segmentation to detect a surrounding environment may receive an image and output object information. The form of the learning data and the input data may be an image, and the image may include a plurality of pixels. The output data and labeling data may be object information. Additionally, by visualizing the output data and labeling data, information can be conveyed visually to the user.

There is no limitation on the types of images for performing the image segmentation. The image may be an image captured by a camera. Images acquired from various cameras such as monocular cameras, binocular cameras, infrared cameras, and TOF cameras may be used. In addition, the image is not limited to a two-dimensional image, and a three-dimensional image is also possible. Moreover, this image may be the image data described above in Step S100.

When the image segmentation is performed once, only one image can be input. Alternatively, a plurality of images may be input. After pre-processing the image captured by the camera, the image can be input into the artificial neural network. Here, preprocessing refers to all kinds of processing performed on the captured image, and includes image normalization, image resize, cropping, noise removal, defogging which removes fog included in the image, fine dust removal, salt removal, droplet removal, and combinations thereof. Looking at normalization as an example of preprocessing, the normalization may mean obtaining an average of RGB values of all pixels of an RGB image and subtracting the average from the RGB image. Looking at the removal of water droplets as another example of preprocessing, removal of water droplets refers to removing water droplets from images captured by preprocessing, such as water droplets on the front of the camera, or removing rainwater captured on a rainy day from images through preprocessing. Through such image preprocessing, the performance/accuracy of the artificial neural networks can be improved.

Output data/labeling data of the artificial neural network may correspond to an input image/learning image. Moreover, the output data and labeling data may correspond to each other.

The output data and labeling data may include a plurality of pieces of information. The output data and labeling data may be determined by reflecting a plurality of pieces of information. The output data and labeling data may include a plurality of output values and a plurality of labeling values, respectively. The output value and the labeling value may include a plurality of pieces of information. Alternatively, the output value and the labeling value may be determined by reflecting a plurality of pieces of information.

The output value and the labeling value may correspond to pixels of an image input into the artificial neural network. Moreover, the output value and the labeling value may correspond to each other.

The number of output values and labeling values may be equal to the number of pixels of the input image. For example, when an image of 256×256 pixels is input, the number of output values and labeling values may also be 256×256=65536. Alternatively, the number of output values and labeling values may be an integer multiple of the number of pixels of the input image. Hereinafter, a case in which the number of pixels of the input image and the number of output values and labeling values are the same will be described, but is not limited thereto, and the number of pixels, the number of output values, and the number of labeling values may be different. The output data and labeling data may be object information. Here, the object information refers to information about attributes of an object included in the image, and is not limited as long as it is information about the object.

The object may include an obstacle such as terrain, buildings, people, and the like, and the object information is not limited to existence, type, location, movement direction, movement speed, and the like of the object. The object information may include only a part of the object and the information, or may include all of them. For example, information about obstacles among objects may be referred to as obstacle information.

Also, the object may be information about a lane on a road where the traveling vehicle 100 is located during the traveling of the traveling vehicle 100.

Pixel-based image segmentation classifies each pixel of an image into a specific class, and Deep CNN can be used for this.

It should be noted that the above-described image segmentation process is only an example, and the interpretation is not limited thereto, and any technique capable of recognizing lanes in image data can be applied.

In Step S300, the lane recognition apparatus 200 may set the recognition weight for the left and right lanes based on the difference between the left and right lane recognition values.

The lane recognition apparatus 200 may calculate a lane recognition value from the lane recognition result in Step S200 and set the recognition weight for each of the left and right lanes based on the difference in recognition values of the left and right lanes. Here, the recognition value may be a value calculated by a recognition degree based on the resolution, image segmentation accuracy, accuracy of image pixels corresponding to the lane, or the like for the lane recognized in the image data in Step S200 in the lane recognition apparatus 200. Therefore, as the recognition value increases, the lane recognition become clearer, and as the recognition value decreases, the lane recognition becomes unclear. Hereinafter, a detailed description of setting the left and right lane recognition weights will be described in detail with reference to FIG. 3.

Figure 3:
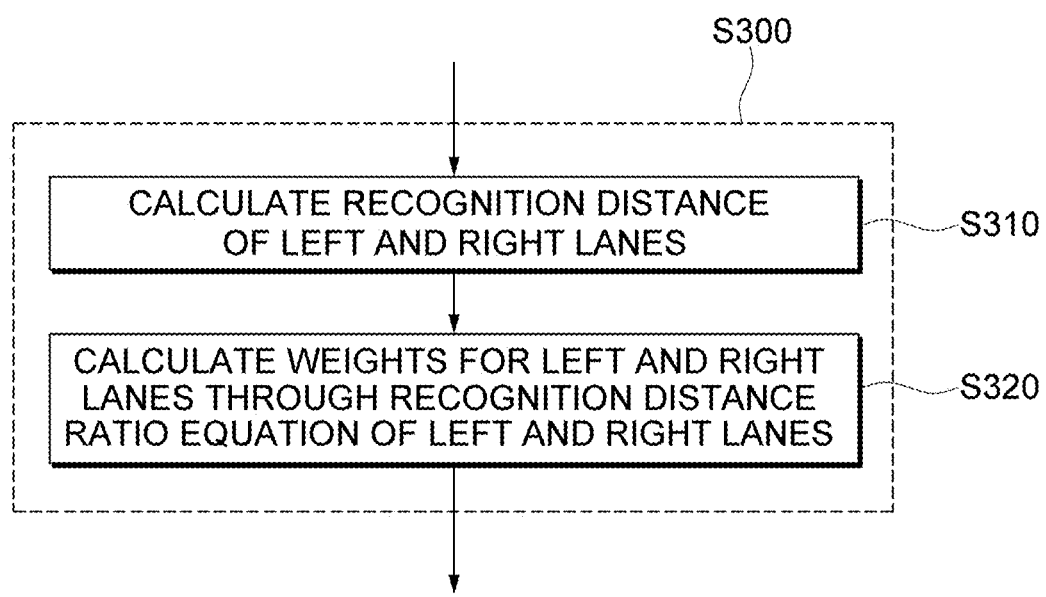
FIG. 3 is a flowchart for specifically explaining a step of setting recognition weights of left and right lanes according to some embodiments of the present disclosure.

FIG. 3 is a flowchart for specifically explaining a step of setting the recognition weights of left and right lanes according to some embodiments of the present disclosure.

In Step S310, the lane recognition apparatus 200 may calculate the recognition distance of the left and right lanes. According to one example, the recognition value calculated by the lane recognition apparatus 200 in Step S300 described above may be calculated based on the recognition distances of the left and right lanes. That is, in Step S300, the recognition value may be calculated based on the resolution and accuracy of lane recognition, but may also be calculated based on the lane recognition distance.

Therefore, the lane recognition apparatus 200 can calculate the distance of the recognized left and right lanes when the recognition distance lengths of the left and right lanes are different based on the image data. In this case, the case where the recognition distance lengths of the left and right lanes are different means that the difference in the recognition distance lengths of the left and right lanes exceeds the critical difference, and it should be noted that the threshold difference is a value that may vary depending on the environment and settings of a user, and the value is not fixed and interpreted as a certain value.

In Step S320, the lane recognition apparatus 200 may calculate weights for the left and right lanes through the recognition distance ratio equation of the left and right lanes.

The lane recognition apparatus 200 can calculate the lane weight of the left and right lanes through the recognition distance ratio equation when the recognition distances of the left and right lanes are different. In this case, the weight of the left lane can be calculated as left lane recognition distance/(left lane recognition distance+right lane recognition distance), and the weight of the right lane can be calculate as right lane recognition distance/(left lane recognition distance+right lane recognition distance).

Furthermore, the left and right lane weights can be calculated in real time during the traveling of the traveling vehicle 100.

Returning to FIG. 2 again, in Step S400, the lane recognition apparatus 200 may calculate a center curvature and curvature change rate for center following of the traveling vehicle 100 based on the left and right lane recognition weights.

The lane recognition apparatus 200 may calculate the center curvature and curvature change rate for center following. In this case, the center curvature means the degree of curvature of the traveling during the traveling of the traveling vehicle 100, not a straight lane, and the curvature change rate means the change rate of the traveling curvature.

The center curvature is calculated as left curvature×left lane weight+right curvature×right lane weight, and the left curvature and right curvature mean the lane curvatures of the left and right lanes, respectively. Here, the curvature change rate is calculated as the left curvature change rate×left lane weight+right curvature change rate×right lane weight. In this case, the left curvature change rate and the right curvature change rate mean the change rate of the left and right lane curvatures, respectively. Therefore, the center curvature and the center curvature change rate may be values that change according to the left and right lane weights set in the lane recognition apparatus 200.

The lane recognition apparatus 200 may set the weights of the left and right lanes to 1 and calculate the center curvature and center curvature change rate when reliability of recognition of the left and right lanes is high. In this case, when the recognition reliability of both the left and right lanes is high, it means that the difference between the recognition distances of the left and right lanes recognized by the above-described lane recognition apparatus 200 is less than the threshold distance. Therefore, in this case, the lane recognition apparatus 200 may set the weight of each of both the left and right lanes to 1, or set the weight of any one of them to 1. In this case, when the weights of the left and right lanes are set to 1, the calculated weights may be applied as they are to the weights of other lanes that are not set to 1.

In addition, the lane recognition apparatus 200 may set the weight of the lane having high reliability to 1 when any one of the left and right lanes has low recognition reliability. Here, when the recognition reliability of any one of the left and right lanes is low, a case where the recognition distance recognized by the lane recognition apparatus 200 is shorter than an absolute threshold distance may means that the weight of the lane higher than the absolute threshold distance is set to 1.

Therefore, the lane recognition apparatus 200 can control the center following of a traveling vehicle by setting the weight of the relatively clearly recognition distance to 1 when the recognition distance is significantly short among the left and right lanes. Here, the absolute threshold distance may be the same value as or different from the aforementioned threshold distance, and may be a value shorter than the threshold distance, and the absolute threshold distance may be a dynamically changeable value and may be set according to a user or environment.

In Step S500, the lane recognition apparatus 200 may transmit a center following signal of the traveling vehicle 100 based on the center curvature and the curvature change rate.

The lane recognition apparatus 200 may transmit the calculated center curvature and curvature change rate to the traveling vehicle 100 as the center following signal, and the traveling vehicle 100 may travel based on the received center curvature and curvature change rate.

Hereinafter, a system to which an embodiment of the present disclosure may be applied will be described using FIG. 4.

Figure 4:
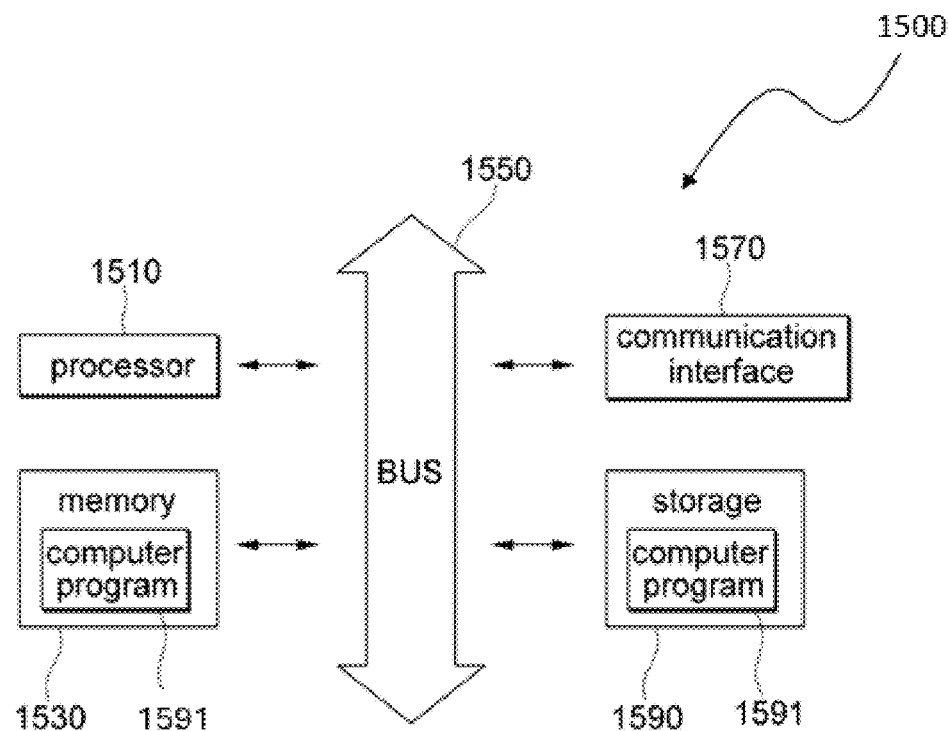
FIG. 4 is a diagram of an exemplary computing device in which devices and/or systems in accordance with various embodiments of the present disclosure may be implemented.

FIG. 4 is a diagram of an exemplary computing device in which devices and/or systems in accordance with various embodiments of the present disclosure may be implemented.

A computing device 1500 may include one or more processors 1510, a bus 1550, a communication interface 1570, a memory 1530 for loading a computer program 1591 executed by the processor 1510, and a storage 1590 for storing the computer program 1591. However, only components related to the embodiment of the present disclosure are illustrated in FIG. 4. Accordingly, those skilled in the art to which the present disclosure belongs may know that other general-purpose components may be further included in addition to the components illustrated in FIG. 4.

The processor 1510 controls the overall operation of each component of the computing device 1500. The processor 1510 may be configured to include a Central Processing Unit (CPU), a Micro Processor Unit (MPU), a Micro Controller Unit (MCU), a Graphic Processing Unit (GPU), or any type of processor well known in the art of the present disclosure. Moreover, the processor 1510 may perform an operation for at least one application or program for executing a method according to embodiments of the present disclosure. The computing device 1500 may include one or more processors.

The memory 1530 stores various data, commands and/or, information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides a communication function between components of the computing device 1500. The bus 1550 may be implemented as various types of buses such as an address bus, a data bus, and a control bus.

The communication interface 1570 supports wired and wireless Internet communication of the computing device 1500. Moreover, the communication interface 1570 may support various communication methods other than Internet communication. To this end, the communication interface 1570 may include a communication module well known in the art of the present disclosure.

According to some embodiments, the communication interface 1570 may be omitted.

The storage 1590 may non-temporarily store the one or more programs 1591 and various data.

The storage 1590 may be configured to include a non-volatile memory such as read only memory (ROM), erasable programmable ROM (EPROM), electrically erasable programmable ROM (EEPROM), and flash memory, a hard disk, a removable disk, or any form of computer-readable recording medium well known in the art to which the present disclosure pertains.

The computer program 1591 may include one or more instructions that, when loaded into the memory 1530, cause the processor 1510 to perform methods/operations according to various embodiments of the present disclosure. That is, the processor 1510 may perform methods/operations according to various embodiments of the present disclosure by executing the one or more instructions.

So far, various embodiments of the present disclosure and effects according to the embodiments have been described with reference to FIGS. 1 to 4. Effects according to the technical spirit of the present disclosure are not limited to the effects mentioned above, and other effects not mentioned will be clearly understood by those skilled in the art from the description of the specification.

The technical spirit of the present disclosure described with reference to FIGS. 1 to 4 so far may be implemented as computer readable code on a computer readable medium. The computer-readable recording medium may be, for example, a removable recording medium (CD, DVD, Blu-ray disc, USB storage device, removable hard disk) or a fixed recording medium (ROM, RAM, computer-equipped hard disk). The computer program recorded on the computer-readable recording medium may be transmitted to another computing device through a network such as the Internet, installed in the other computing device, and thus used in the other computing device.

In the above description, even though all the components constituting the embodiments of the present disclosure have been described as being combined or operated as one, the technical spirit of the present disclosure is not necessarily limited to these embodiments. That is, within the scope of the purpose of the present disclosure, all of the components may be selectively combined with one or more to operate.

Although the operations are illustrated in a particular order in the drawings, it should not be understood that the operations must be performed in the particular order illustrated or in a sequential order, or that all illustrated operations must be performed to obtain a desired result. In certain circumstances, multitasking and parallel processing may be advantageous. Moreover, the separation of various components in the embodiments described above should not be understood as requiring such separation, and it should be understood that the described program components and systems may generally be integrated together into a single software product or packaged into multiple software products.

Although the embodiments of the present disclosure have been described with reference to the accompanying drawings, a person of ordinary skill in the art to which the present disclosure belongs can understand that the present disclosure can be implemented in other specific forms without changing the technical spirit or essential characteristics. Therefore, it should be understood that the embodiments described above are illustrative in all respects and not limiting. The protection scope of the present disclosure should be interpreted by the following claims, and all technical spirits within the equivalent range should be construed as being included in the scope of rights of the technical spirits defined by the present disclosure.

What is claimed is:

1. A method which is performed by a lane recognition apparatus to control center following of a traveling vehicle by applying a lane weight, the method comprising:
receiving image data including a lane during traveling of the traveling vehicle;
analyzing the image data to
recognize left and right lanes in the image data, and obtain a left lane recognition distance from the traveling vehicle to the left lane and a right lane recognition distance from the traveling vehicle to the right lane;
setting recognition weights for the left and right lanes based on a difference between the left lane recognition distance and the right lane recognition distance;
calculating a center curvature and a center curvature change rate for following a center between the left lane and the right lane based on the left and right lane recognition weights and left and right lane curvatures; and
controlling the traveling vehicle to travel along the center between the left lane and the right lane based on the center curvature and the center curvature change rate,
wherein, when the difference between the left lane recognition distance and the right lane recognition distance is equal to or less than a threshold value, the recognition weights for the left and right lanes are set to be equal.

2. The method of claim 1, wherein the setting of the recognition weights for the left and right lanes includes calculating the recognition weights for the left and right lanes through a recognition distance ratio equation of the left and right lanes.

3. The method of claim 2, wherein the recognition distance ratio equation is an equation calculated as a ratio of the left and right lane recognition distances to a sum of the left lane recognition distance and the right lane recognition distance.

4. The method of claim 1, wherein setting of the recognition weights for the left and right lanes are performed only in cases where the difference between the left lane recognition distance and the right lane recognition distance is equal to or less than a threshold value.

5. A lane recognition apparatus for controlling center following of a traveling vehicle by applying lane weight, the apparatus comprising:
a processor;
a network interface;
a memory; and
a computer program loaded into the memory and executed by the processor,
wherein the processor, when executing the computer program, performs:
receiving image data including a lane during traveling of the traveling vehicle,
analyzing the image data to
recognize left and right lanes in the image data, and obtain a left lane recognition distance from the traveling vehicle to the left lane and a right lane recognition distance from the traveling vehicle to the right lane;
setting recognition weights for left and right lanes based on a difference between the left lane recognition distance and the right lane recognition distance,
calculating a center curvature and a center curvature change rate for following a center between the left lane and the right lane based on the left and right lane recognition weights and left and right curvatures, and
controlling the traveling vehicle to travel along the center between the left lane and the right lane based on the center curvature and the center curvature change rate,
wherein, when the difference between the left lane recognition distance and the right lane recognition distance is equal to or less than a threshold value, the recognition weights for the left and right lanes are set to be equal.

6. The apparatus of claim 5, wherein the setting of the recognition weight for the left and right lanes includes calculating the recognition weights for the left and right lanes through a recognition distance ratio equation of the left and right lanes.

7. The apparatus of claim 6, wherein the recognition distance ratio equation is an equation calculated as a ratio of the left and right lane recognition distances to a sum of the left lane recognition distance and the right lane recognition distance.

8. The apparatus of claim 7, wherein the center curvature for center following is calculated as a sum of a product of the left lane curvature and a left lane recognition weight and a product of the right lane curvature and a right lane recognition weight.

9. The apparatus of claim 8, wherein the center curvature change rate for center following is calculated as a sum of a product of a left lane curvature change rate and the left lane recognition weight, and a product of a right lane curvature change rate and the right lane recognition weight.

10. The apparatus of claim 5, wherein, when the difference between the left lane recognition distance and the right lane recognition distance is equal to or less than a threshold value, each of the recognition weights of the left and right lanes is set to 1.

11. The apparatus of claim 5, wherein, when the difference between the left lane recognition distance and the right lane recognition distance is equal to or less than a threshold value, any one of the recognition weights of the left and right lanes is set to 1.

12. A lane recognition system for controlling center following, the lane recognition system comprising:
a traveling vehicle; and a lane recognition apparatus
wherein the lane recognition apparatus is configured to perform:
receiving image data including a lane during traveling of a traveling vehicle,
analyzing the image data to
recognize left and right lanes in the image data, and
obtain a left lane recognition distance from the traveling vehicle to the left lane and a right lane recognition distance from the traveling vehicle to the right lane,
setting recognition weights for the left and right lanes based on a difference between the left lane recognition distance and the right lane recognition distance,
calculating a center curvature and a center curvature change rate for following a center between the left lane and the right lane based on the left and right lane recognition weights and left and right lane curvatures, and
controlling the traveling vehicle to travel along the center between the left lane and the right lane based on the center curvature and the center curvature change rate,
wherein, when the difference between the left lane recognition distance and the right lane recognition distance is equal to or less than a threshold value, the recognition weights for the left and right lanes are set to be equal.

13. The lane recognition system of claim 12, wherein the setting the recognition weight for the left and right lanes includes calculating the recognition weights for the left and right lanes through a recognition distance ratio equation of the left and right lanes.

14. The lane recognition system of claim 13, wherein the recognition distance ratio equation is an equation calculated as a ratio of the left and right lane recognition distances to a sum of the left lane recognition distance and the right lane recognition distance.

15. The lane recognition system of claim 14, wherein the center curvature for center following is calculated as a sum of a product of the left lane curvature and a left lane recognition weight and a product of the right lane curvature and a right lane recognition weight.

16. The lane recognition system of claim 15, wherein the center curvature change rate for center following is calculated as a sum of a product of a left lane curvature change rate and the left lane recognition weight, and a product of a right lane curvature change rate and the right lane recognition weight.

17. The lane recognition system of claim 12, wherein, when the difference between the left lane recognition distance and the right lane recognition distance is equal to or less than a threshold value, each of the recognition weights of the left and right lanes is set to 1.

18. The lane recognition system of claim 12, wherein, when the difference between the left lane recognition distance and the right lane recognition distance is equal to or less than a threshold value, any one of the recognition weights of the left and right lanes is set to 1.

* * * * *